US009060228B2

(12) United States Patent
Lee et al.

(10) Patent No.: US 9,060,228 B2
(45) Date of Patent: Jun. 16, 2015

(54) ACCESSORY DETECTION CIRCUIT WITH IMPROVED FUNCTIONALITY

(71) Applicant: Fairchild Semiconductor Corporation, San Jose, CA (US)

(72) Inventors: Tony Cheng Han Lee, South Portland, ME (US); Shawn Kirk Barden, Gorham, ME (US); Seth M. Prentice, Auburn, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/915,150

(22) Filed: Jun. 11, 2013

(65) Prior Publication Data

US 2014/0038460 A1    Feb. 6, 2014

Related U.S. Application Data

(60) Provisional application No. 61/679,363, filed on Aug. 3, 2012.

(51) Int. Cl.
*H04R 1/10* (2006.01)
*H03H 11/40* (2006.01)
*H04R 29/00* (2006.01)
*H04M 1/60* (2006.01)
*H04R 5/04* (2006.01)

(52) U.S. Cl.
CPC .......... *H04R 29/004* (2013.01); *H04M 1/6058* (2013.01); *H04R 5/04* (2013.01); *H04R 2201/107* (2013.01); *H04R 2420/05* (2013.01); *H04R 2499/11* (2013.01)

(58) Field of Classification Search
CPC .................................... H04M 1/6058
USPC ............................ 381/74; 327/524
See application file for complete search history.

(56) References Cited

U.S. PATENT DOCUMENTS 4,764,750 A    8/1988  Kawada
7,565,458 B2   7/2009  Thijssen et al.
(Continued)

FOREIGN PATENT DOCUMENTS

CN    102056072 A    5/2011
CN    102680794 A    9/2012
(Continued)

OTHER PUBLICATIONS

"U.S. Appl. No. 12/606,562 , Response filed Jan. 3, 2012 to Final Office Action mailed Oct. 28, 2011", 7 pgs.

(Continued)

*Primary Examiner* — Ernest Unelus
(74) *Attorney, Agent, or Firm* — Schwegman Lundberg & Woessner, P.A.

(57) ABSTRACT

An apparatus comprises a first connector, a second connector, a detection circuit and a logic circuit. The first connector and the second connector are configured for electrical communication with first and second conducting terminals, respectively, of an audio jack plug. The detection circuit is configured to apply a first value of current to the first connector, and apply a second value of current to the second connector. The logic circuit is configured to generate an indication that the audio jack plug is fully inserted according to a logic level detected at the second connector when electrical ground is detected at the first connector.

23 Claims, 4 Drawing Sheets

(56) References Cited

U.S. PATENT DOCUMENTS

| | | | |
|---|---|---|---|
| 8,230,126 B2 | 7/2012 | Siulinski | |
| 8,244,927 B2 | 8/2012 | Chadbourne et al. | |
| 8,489,782 B2 | 7/2013 | Chadbourne et al. | |
| 2005/0268000 A1 | 12/2005 | Carlson | |
| 2006/0147059 A1 | 7/2006 | Tang | |
| 2007/0082634 A1 | 4/2007 | Thijssen et al. | |
| 2008/0150512 A1 | 6/2008 | Kawano | |
| 2008/0164994 A1* | 7/2008 | Johnson et al. | 340/533 |
| 2008/0318629 A1 | 12/2008 | Inha et al. | |
| 2009/0198841 A1 | 8/2009 | Yoshida et al. | |
| 2011/0099298 A1 | 4/2011 | Chadbourne et al. | |
| 2011/0099300 A1 | 4/2011 | Siulinski | |
| 2012/0019309 A1* | 1/2012 | Turner et al. | 327/524 |
| 2012/0198183 A1 | 8/2012 | Wetzel et al. | |
| 2012/0326736 A1 | 12/2012 | Chadbourne et al. | |
| 2013/0156216 A1 | 6/2013 | Shah et al. | |
| 2013/0158919 A1 | 6/2013 | Shah et al. | |

FOREIGN PATENT DOCUMENTS

| | | |
|---|---|---|
| CN | 103581787 A | 2/2014 |
| DE | 102010049654 A1 | 6/2011 |
| KR | 20110046361 A | 5/2011 |
| KR | 102014001810 A | 2/2014 |

OTHER PUBLICATIONS

"U.S. Appl. No. 12/606,562 , Response filed Sep. 13, 2011 to Non Final Office Action mailed Jun. 22, 2011", 9 pgs.

"U.S. Appl. No. 12/606,562, Final Office Action mailed Oct. 28, 2011", 10 pgs.

"U.S. Appl. No. 12/606,562, Non Final Office Action mailed Jun. 22, 2011", 9 pgs.

"U.S. Appl. No. 12/606,562, Notice of Allowance Mailed Jan. 27, 2012", 7 pgs.

"U.S. Appl. No. 12/606,562, Response to Rule 312 Communication mailed May 29, 2012", 1 pgs.

"U.S. Appl. No. 12/606,562, Response to Rule 312 Communication mailed Jul. 2, 2012", 2 pgs.

"U.S. Appl. No. 12/606,582, Final Office Action mailed Dec. 8, 2011", 10 pgs.

"U.S. Appl. No. 12/606,582, Non Final Office Action mailed Jul. 14, 2011", 8 pgs.

"U.S. Appl. No. 12/606,582, Notice of Allowance mailed Apr. 12, 2012", 8 pgs.

"U.S. Appl. No. 12/606,582, Response filed Mar. 6, 2012 to Final Office Action mailed Dec. 8, 2011", 10 pgs.

"U.S. Appl. No. 12/606,582, Response filed Sep. 28, 2011 to Non Final Office Action mailed Jul. 14, 2011", 10 pgs.

"U.S. Appl. No. 13/584,465 , Response filed Jan. 9, 2013 to Non Final Office Action mailed Nov. 15, 2012", 8 pgs.

"U.S. Appl. No. 13/584,465, Non Final Office Action mailed Nov. 15, 2012", 8 pgs.

"U.S. Appl. No. 13/584,465, Notice of Allowance mailed Mar. 18, 2013", 7 pgs.

"Chinese Application Serial No. 201220044818.X, Notification to Make Rectification mailed Jul. 17, 2012", 3 pg.

"Chinese Application Serial No. 201220044818.X, Response filed Oct. 8, 2012 to Office Action mailed Jul. 17, 2012", 3 pgs.

"USB OTG Mechanical Presentation", [Online] Retrieved from the Internet on Jun. 3, 2011 http://www.usb.org/developers/onthego/london/OTG_mechanical.pdf, (Feb. 26, 2002), 27 pgs.

"USB Remote Cable", [Online]. Retrieved from the Internet: <URL: http://chdk.wikia.com/wiki/USB_Remote_Cable>, (Jun. 9, 2009), 4 pgs.

Mehta, Arpit, "Keep Power Consumption in Check with Low-Power Comparators that Autosense Plugged-In Accessories", [Online]. Retrieved from the Internet: <URL: http://www.maxim-ic.com/appnotes.cfm/an_pk/4327>, (Feb. 27, 2009), 6 pgs.

"U.S. Appl. No. 13/359,006, Non Final Office Action mailed Feb. 14, 2014", 12 pgs.

"U.S. Appl. No. 13/359,006, Advisory Action mailed Aug. 13, 2014", 3 pgs.

"U.S. Appl. No. 13/359,006, Amendment and Response filed May 19, 2014 to Non Compliant Amendment mailed May 16, 2014", 10 pgs.

"U.S. Appl. No. 13/359,006, Final Office Action mailed Jun. 5, 2014", 14 pgs.

"U.S. Appl. No. 13/359,006, Response filed May 8, 2014 to Non Final Office Action mailed Feb. 14, 2014", 10 pgs.

"U.S. Appl. No. 13/359,006, Response filed Jul. 24, 2014 to Final Office Action mailed Jun. 5, 2014", 10 pgs.

* cited by examiner

ACCESSORY DETECTION CIRCUIT WITH IMPROVED FUNCTIONALITY

CLAIM OF PRIORITY

This document claims the benefit of priority to U.S. Provisional Patent Application Ser. No. 61/679,363, filed on Aug. 3, 2012, which is incorporated herein by reference in its entirety.

BACKGROUND

Many types of personal electronic devices are available for providing management of personal information and for providing personal media entertainment. Some examples include a tablet computer, a cellular telephone, and a smart phone. Some of these devices can be used with a set of headphones that include a microphone. To enable the microphone, a mechanical switch is typically provided with the headphones. The present inventors have recognized that it is desirable to simplify device interfaces for the user.

Overview

This document relates generally to systems and methods for automatically detecting a device when it is connected to a host device, and in particular, to detecting the presence and type of an accessory device from the interconnection with the host device.

An apparatus example includes a first connector, a second connector, a detection circuit and a logic circuit. The first connector and the second connector are configured for electrical communication with first and second conducting terminals, respectively, of an audio jack plug. The detection circuit is configured to apply a first value of current to the first connector, and apply a second value of current to the second connector. The logic circuit is configured to generate an indication that the audio jack plug is fully inserted according to a logic level detected at the second connector when electrical ground is detected at the first connector.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

This document relates generally to systems and methods for automatically detecting the presence of a headphone set when it is connected to a host device and to automatically detecting whether the headphone set includes a microphone.

Figure 1:
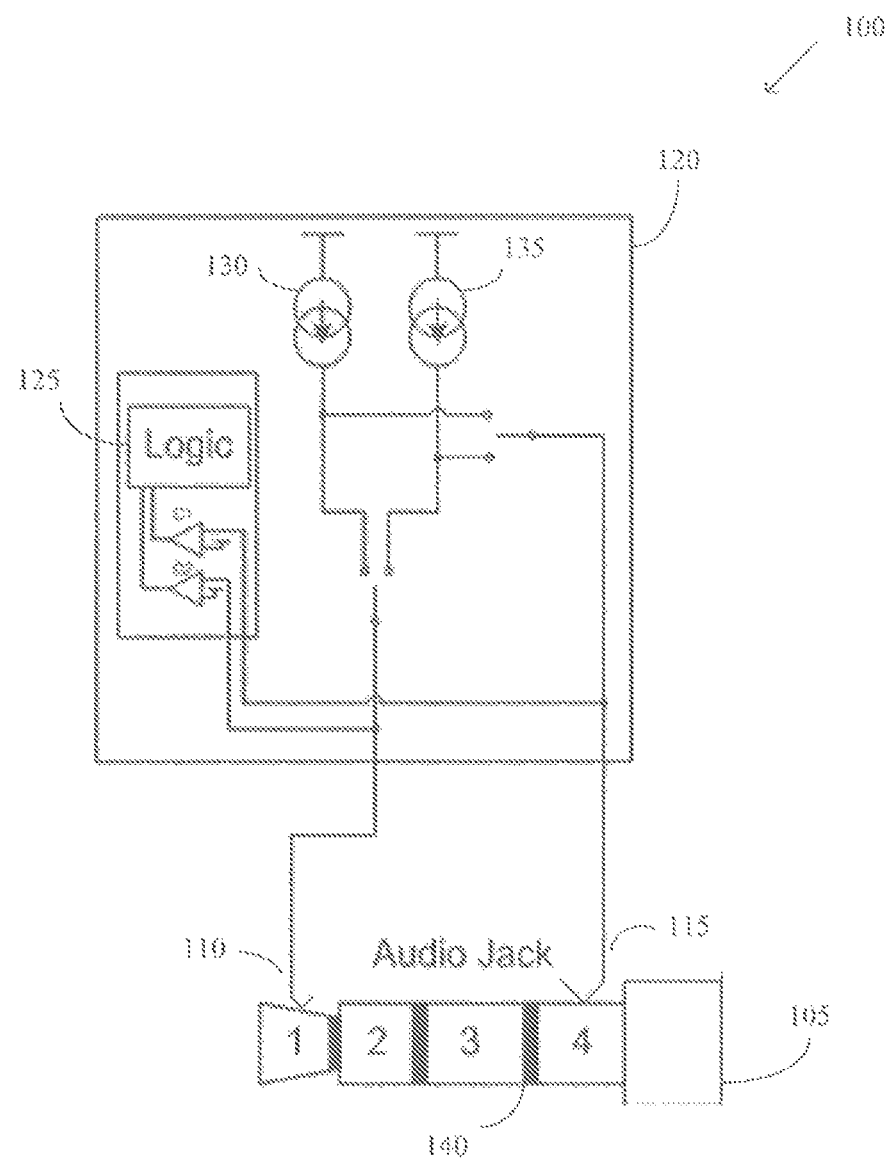
FIG. 1 is a block diagram illustrating of portions of an example of a device to automatically detect insertion of an audio jack plug.

FIG. 1 is a block diagram illustrating of portions of an example of a device 100 to automatically detect insertion of an audio jack plug 105 of a set of headphones into the device 100 and to determine whether a microphone is present. The device 100 may be included in, among other things, a cellular telephone, a smart phone, a tablet computer or other portable electronic system. The device 100 includes a first connector 110 and a second connector 115. The connectors provide electrical communication with a first conducting terminal and a second conducting terminal, respectively, of the audio jack plug 105.

The illustration of the audio jack plug 105 shows four positions for conducting terminals on the plug. Positions one and two are for connections to headphone speakers (e.g., position one for the right headphone speaker and position two for the left headphone speaker). Position three is typically a connection to electrical ground and position four is a connection to a microphone if a microphone is present (e.g., a four-pole headset). As shown in the illustration, the first connector 110 provides electrical communication to the first conducting terminal at position one of the audio jack plug 105 and the second connector 115 provides electrical communication to the second conducting terminal at position four of the audio jack plug 105.

The device 100 further includes a detection circuit 120 and a logic circuit 125. The detection circuit 120 can include a first current source 130 and a second current source 135. The detection circuit 120 applies a first value of current from the first current source 130 to the first connector 110. The detection circuit 120 detects insertion of the audio jack plug 105 when detecting electrical ground at the first connector 110. From the illustration in FIG. 1, it can be seen that a change at the first connector 110 due to the audio jack plug 105 would occur when the audio jack plug in fully inserted into an audio jack receptacle that includes the first connector 110. The connection to electrical ground can be detected using logic or a comparator. The first value of current can be small (e.g., 500 nano-amps (500 nA)) to conserve power. Conserving power may be desirable if the device 100 is included in a battery powered system.

The detection circuit 120 applies a second value of current from the second current source 135 to the second connector 115. The second value of current may be larger than the first value of current (e.g., 150 micro-amps (150 µA) or 300 µA). In some examples, the second value of current is applied to the second connector 115 when electrical ground is connected at the first connector 110. This conserves power by only activating the first lower current value until electrical activity is detected at the first connector 110. Although the current is shown applied using multiple current sources, in certain examples the detection circuit includes one adjustable (e.g., programmable) current source to provide the detection current.

The logic circuit 125 can be standalone, or it can be included in a state machine circuit or a processor circuit. The logic circuit 125 generates an indication that the audio jack plug is fully inserted according to a logic level detected at the second connector 115 when electrical ground is detected at the first connector 110. For example, the logic circuit 125 may indicate that the audio jack plug is fully inserted when a "high" logic level is detected at the second connector 115 and electrical ground is detected at the first connector 110. In certain examples, the second value of current applied to the second connector 115 is sufficient to activate a microphone connected at position four of the audio jack plug 105. Activating the microphone may result in a voltage present at the second connector 115 that can be interpreted as a high logic level. In some examples, the high logic level is generated by a comparator when the voltage present at the second connector 115 reaches a specified threshold voltage value. When the high logic level is present and electrical ground is detected at the first connector, the logic circuit 125 may generate an indication that the microphone connection is present.

If the audio jack plug 105 does not include a microphone connection, the audio jack plug 105 may be for a three-pole headphone set. In this case, electrical ground is typically present at the second connector 115. The logic circuit 125 may generate an indication that a three pole headphone set is present when the audio jack plug 105 is fully inserted and electrical ground is detected at the first connector and electrical ground is detected at the second connector. If both the first connector and the second connector are at a high level, then nothing is inserted and the logic circuit 125 does not indicate that a plug was inserted. If the first connector is at a high level and the second connector is at electrical ground, an error indication may be generated. Table 1 includes a summary of an example of detection results by the detection circuit 320 and the logic circuit 325.

TABLE 1

| Logic Level Detected at First Connector | Logic Level Detected at Second Connector | Indication |
|---|---|---|
| 0 | 0 | 3-pole Headphone |
| 0 | 1 | 4-pole Headset (with MIC) |
| 1 | 0 | Error or Other Accessory |
| 1 | 1 | No Plug Inserted |

Other error conditions may arise. For instance, the presence of moisture in the audio jack plug receptacle may cause an impedance at the first connector 110 that can cause a false detection of electrical ground. According to some examples, the detection circuit 120 increases the value of current applied to the first connector 110 when detecting electrical ground at the first connector using the first current value. The increased value of current may be applied to the first connector by the second current source, a third current source, a combination of the first current source and the second current source, or by an adjustable current source. If the connection at the first connector 110 is not true ground, the increased current may cause the voltage at the first connector 110 to increase higher than electrical ground. If the voltage at the first connector remains at electrical ground with the increased current, an audio jack plug is determined to be inserted and the electrical ground detection is not a false indication. Thus, the logic circuit 125 generates the indication that the audio jack plug is fully inserted according to the logic level detected at the second connector when electrical ground is detected at the first connector when both the first value of current and the increased value of current are applied to the first connector 110.

In some examples, the detection circuit 120 is able to detect other types of accessories connected to the audio jack plug 105. The detection circuit 120 may apply a value of current to the first connector 110 or another connector using the current sources shown or a dedicated third current source. The detection circuit 120 may detect a voltage at the first connector (or other connector) that is lower than a circuit supply voltage and higher than electrical ground. Based on the value of the detected voltage the logic circuit 125 generates an indication of a function associated with the audio jack plug according to the detected voltage.

The detection circuit 120 may also be able to detect when the audio jack plug 105 is removed. As explained previously, the device 100 applies a current value to a connector (e.g., second connector 115 in FIG. 1) that provides electrical communication to the second conducting terminal at position four of the audio jack plug 105, and position four is associated with the microphone connection. The current value applied at the connector may activate the microphone causing a voltage less than a circuit supply voltage to be present at position four of the plug.

Removal of the audio jack plug causes the conducting terminals at position four through position one to pass by the second connector 115. In the illustration of FIG. 1, the dark bands between conducting terminals of positions one through four are non-conducting. As the conducting terminals and non-conducting bands pass by the second connector 115, the voltage at the second connector goes through transitions. The detection circuit 120 detects the voltage level at the second connector that is less than a circuit supply rail voltage and greater than electrical ground, and detects a voltage transition at the connector. The logic circuit 125 is configured to generate an indication of removal of an audio jack plug according to the transition detected by the detection circuit 120.

For example, when the audio jack plug 105 is fully inserted, the second connector 115 will be in electrical communication with the conducting terminal at position four of the plug; the microphone connector. The voltage at the second connector 115 will be somewhat less than the high circuit supply rail. When the audio jack plug 105 is removed from the plug receptacle, the second connector 115 will contact the non-conducting band 140 between position four and position three. Because the band is non-conducting, the second connector will have an open circuit connection and the voltage at the second connection will transition to the high voltage supply rail. Position three is a connection to electrical ground. As removal of the plug continues, the second connector will be connected to electrical ground when position three reaches the second connector. Thus, the voltage at the second connector 115 goes through a sequential change from an electrical connection to a microphone connector, to an open circuit connection, and then to an electrical ground connection.

The detection circuit 120 may generate an indication of the transition at the second connector 115 and the logic circuit 125 may generate an indication of removal of the audio jack plug 105. In some examples, the logic circuit 125 or other circuit inactivates the first connector 110 and the second connector 115 when the transition in the voltage is detected. This may prevent a clicking or popping noise in the headphone speakers attached to the audio jack plug 105 when the plug is removed. In certain examples, the logic circuit 125 may not generate the indication of removal of the jack plug until more transitions occur at the second connector (e.g., transitions associated with positions two or one of the audio jack plug 105 making electrical connection with the second connector 115), but this may increase the likelihood of noise at the headphone speakers.

Figure 2:
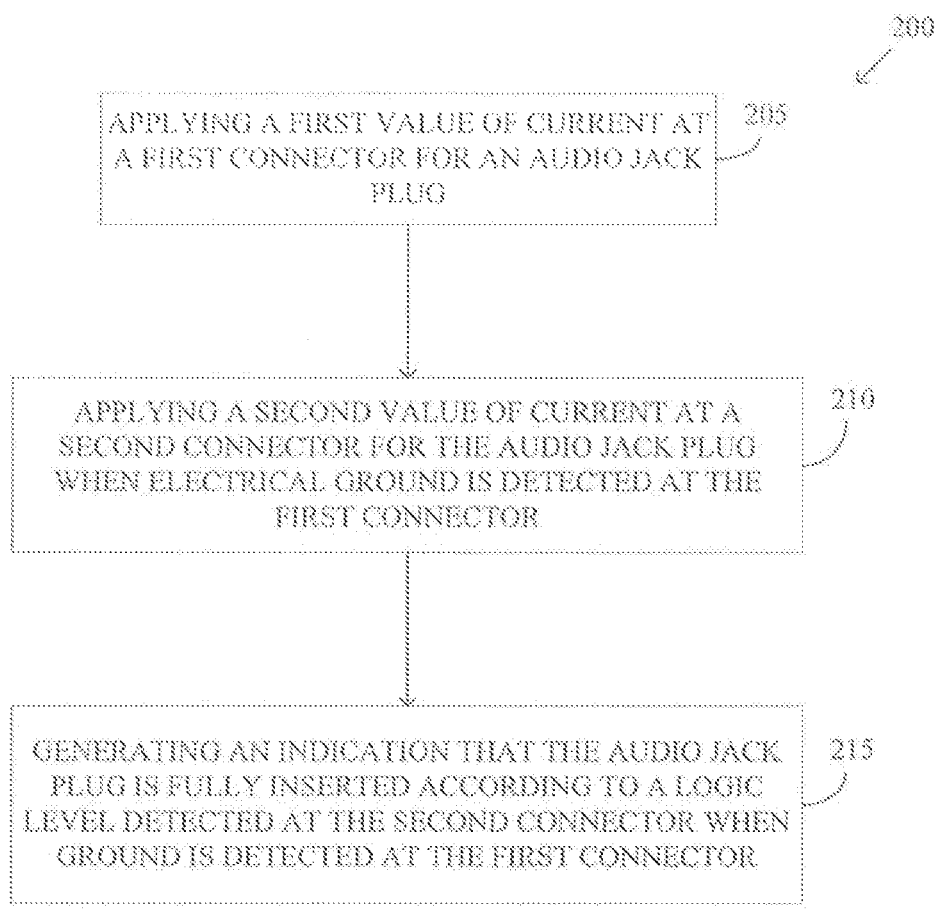
FIG. 2 shows an example of a method of device detection of insertion of an audio jack plug into the device.

FIG. 2 shows an example of a method 200 of device detection of insertion of an audio jack plug into the device. At block 205, a first value of current is applied at a first connector for an audio jack plug.

At block 210, a second value of current is applied at a second connector for the audio jack plug when electrical ground is detected at the first connector by the first value of current being applied to the first connector. In certain examples, the second value of current is applied in response to detecting electrical ground at the first connector.

At block 215, an indication that the audio jack plug is fully inserted is generated according to a logic level detected at the second connector when ground is detected at the first connector. In certain examples, the indication is generated when a high voltage level is detected indicating that the audio jack plug includes a microphone connection. In certain examples, the indication is generated when electrical ground is detected at the second connector indicating that the audio jack plug is for a three pole headphone set. If the logic level is indeterminate, the indication is not generated. In certain examples, if the logic level at the both the first connector and the second connector are high, an indication is generated that an audio jack plug is not present.

Figure 3:
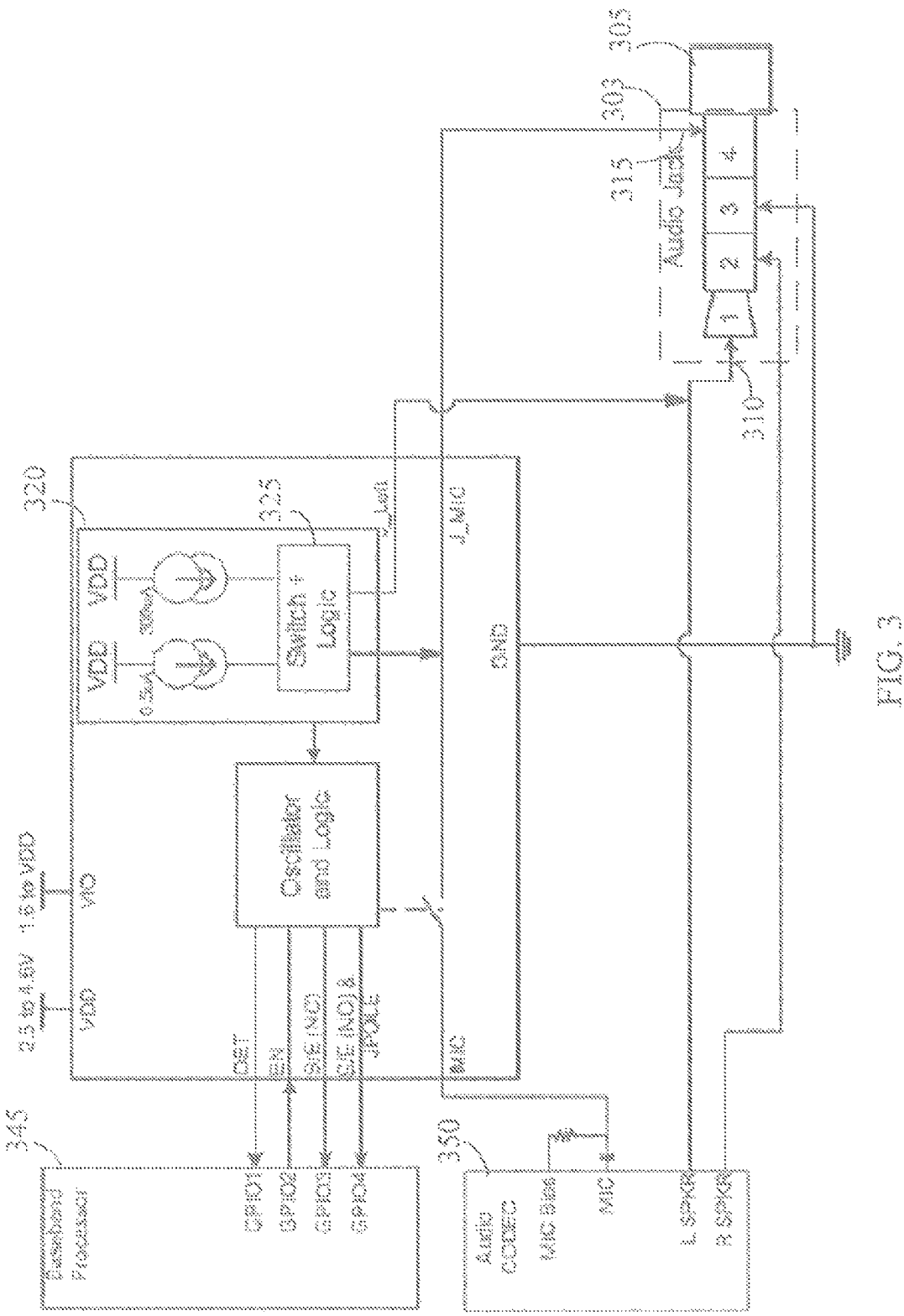
FIG. 3 shows a block diagram illustrating of portions of another example of a device to automatically detect insertion of an audio jack plug into the device.

FIG. 3 shows a block diagram illustrating of portions of another example of a device 300 to automatically detect insertion of an audio jack plug 305 into the device 300. The device 300 includes an audio jack receptacle 303 to receive an audio jack plug 305 of a separate device. The audio jack receptacle 303 includes a first connector 310 for electrical contact with a first conducting terminal of the audio jack plug 305 and a second connector 315 for electrical contact with a second conducting terminal of the audio jack plug 305.

The device 300 also includes a detection circuit 320. The detection circuit 320 applies a first value of current to the first connector 310. The current may be applied by activating a first current source. If electrical ground is detected when the first value of current is applied, a second value of current that is greater than the first value of current is applied to the first connector 310. The increased value of current can be applied by activating a different current source or combining one or more current sources with the first current source using a switching circuit. As explained previously herein, increasing the current applied is useful to determine if the electrical ground is due to insertion of an audio jack plug or is due to an error condition (e.g., moisture).

If electrical ground is still detected at the first connector 310 when the current is increased, current is applied to the second connector 315. The value of current applied to the second connector can be greater than the first value of current. The value of current applied to the second connector can be the second value of current of a third value of current different from the first and second values of current. The value of detection current applied to the first connector 310 and the second connector 315 may be less than a threshold value of current that activates the microphone. When a microphone is detected at the second connector, the current at the second connector can be increased to activate the microphone.

The device 300 includes a logic circuit 325 that generates an indication that the audio jack plug 305 is fully inserted into the receptacle according to a logic level detected at the second connector 315 when electrical ground is detected at the first connector 310. As explained previously herein, the logic level detected can be used to determine the type of accessory connected to the audio jack plug 305.

The device 300 also includes a processor 345. The processor 345 can be a microprocessor, digital signal processor, application specific integrated circuit, or other type of processor. The processor 345 configures an operation of the device 300 in response to the indication that the audio jack plug 305 is fully inserted. The processor 345 may also configure operation of the device 300 based on the indication generated by the logic circuit 325.

For instance, the device 300 may include an audio coder-decoder (CODEC) circuit 350. The processor 345 configures operation of the CODEC circuit 350 in response to the indication that the audio jack plug is fully inserted. In certain examples, the CODEC circuit 350 includes a microphone input and the microphone input connection is activated in response a generated indication that a microphone connection is present at the audio jack plug 305.

In some examples, the detection circuit 320 detects a transition in voltage level at the second connector 315 that indicates removal of the audio jack plug 305 from the receptacle, and the logic circuit 325 generates an indication of removal of an audio jack plug. Examples, of voltage level transitions that indicate this removal were described previously herein. In response to the indication of removal of the audio jack plug 305, the processor 345 may reconfigure the device 300.

Figure 4:
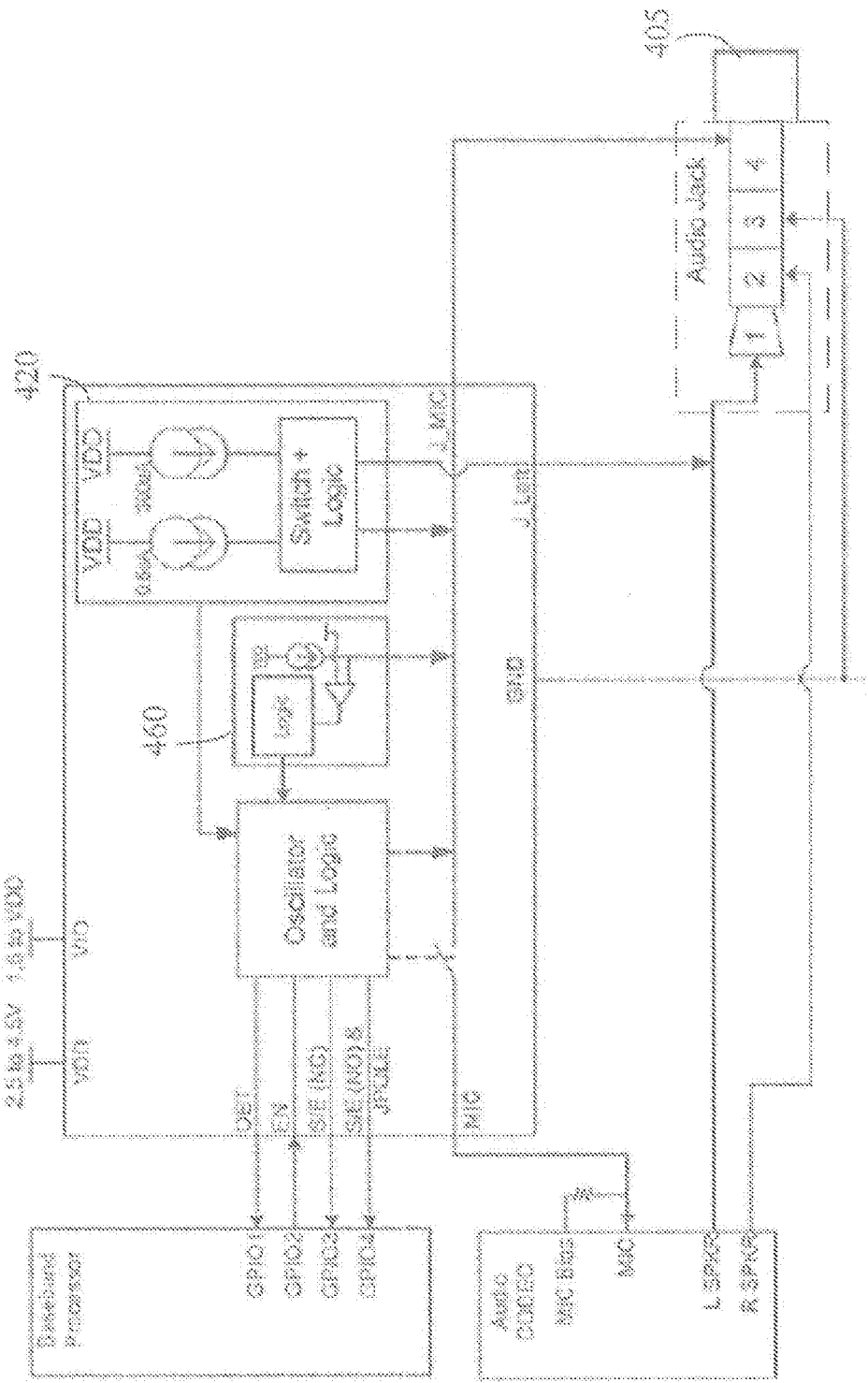
FIG. 4 shows a block diagram illustrating of portions of still another example of a device to automatically detect insertion of an audio jack plug into the device.

FIG. 4 shows a block diagram illustrating of portions of another example of a device 400 to automatically detect insertion of an audio jack plug 405. The example includes a detection circuit 420 to detect insertion of the audio jack plug 405 and a separate removal detection circuit 460 to detect the removal of the plug.

The several examples of devices, methods and systems provide for detection of presence of a connection to a separate device and for determination of accessories or functions of the separate device without a mechanical switch. The examples may also provide robustness in the presence of error causing conditions.

ADDITIONAL NOTES AND EXAMPLES

Example 1 can include subject matter, such as an apparatus) comprising a first connector and a second connector configured for electrical communication with first and second conducting terminals, respectively, of an audio jack plug, a detection circuit and a logic circuit. The detection circuit is configured to apply a first value of current to the first connector and apply a second value of current to the second connector.

In Example 2, the subject matter of Example 1 can optionally include a detection circuit configured to increase the value of current applied to the first connector when detecting electrical ground at the first connector. The logic circuit can be configured to generate the indication that the audio jack plug is fully inserted according to the logic level detected at the second connector when electrical ground is detected at the first connector when both the first value of current and the increased value of current are applied to the first connector.

In Example 3, the subject matter of one or any combination of Examples 1 and 2 optionally includes a logic circuit configured to generate an indication that a microphone connection is present in response to the detecting circuit detecting electrical ground at the first connector and detecting a high logic level at the second connector.

In Example 4, the subject matter of one or any combination of Examples 1-3 optionally includes an audio coder-decoder (CODEC) circuit having a microphone input connection, wherein the microphone input connection is activated in response to receiving the generated indication.

In Example 5, the subject matter of one or any combination of Examples 1-4 optionally includes a logic circuit configured to generate an indication that the audio jack plug is connected to a three-pole headset in response to the detecting circuit detecting electrical ground at the first connector and detecting electrical ground at the second connector.

In Example 6, the subject matter of one or any combination of Examples 1-5 optionally includes a detection circuit configured to detect a voltage level at the second connector that is less than a circuit supply rail voltage and greater than electrical ground, and detect a transition in the voltage detected at the second connector. The logic circuit can be configured to generate an indication of removal of an audio jack plug according to the transition detected by the detection circuit.

In Example 7, the subject matter of Example 6 optionally includes a logic circuit is configured to inactivate the first connector and the second connector when the transition in the voltage is detected.

In Example 8, the subject matter of one or any combination of Examples 1-7 optionally includes a detection circuit configured to generate an indication when detecting a sequential change in an electrical connection of the second connector from an electrical connection to a microphone connector to an open circuit connection to an electrical ground connection, and wherein the logic circuit is optionally configured to inactivate the first connector and the second connector in response to the generated indication.

In Example 9, the subject matter of one or any combination of Examples 1-8 optionally includes a detection circuit configured to detect a voltage at the first connector that is lower than a circuit supply voltage and higher than electrical ground, and wherein the logic circuit is optionally configured to generate an indication of a function associated with the audio jack plug according to the detected voltage.

Example 10 can include subject matter (such as a method, a means for performing acts, or a machine-readable medium including instructions that, when performed by the machine, cause the machine to perform acts), or can optionally be combined with the subject matter of one or any combination of Examples 1-9 to include such subject matter, comprising applying a first value of current at a first connector for an audio jack plug, applying a second value of current at a second connector for the audio jack plug when electrical ground is detected at the first connector when the first value of current is applied to the first connector, and generating an indication that the audio jack plug is fully inserted according to a logic level detected at the second connector when ground is detected at the first connector.

In Example 11, the subject matter of Example 10 optionally includes increasing the value of current applied at the first connector when electrical ground is detected by applying the first value of current, and generating an indication that the audio jack plug is fully inserted according to the logic level detected at the second connector when electrical ground is detected at the first connector when both the first value of current and the increased value of current are applied to the first connector.

In Example 12, the subject matter of one or any combination of Examples 10 and 11 optionally includes generating an indication that a microphone connection is present when detecting electrical ground at the first connector and detecting a high logic level at the second connector.

In Example 13, the subject matter of one or any combination of Examples 10-12 optionally includes activating a microphone connection at an audio coder-decoder (CODEC) circuit in response to the generated indication.

In Example 14, the subject matter of one or any combination of Examples 10-13 optionally includes detecting a voltage level at the second connector that is less than a circuit supply rail voltage and electrical ground, detecting a transition in the voltage detected at the second connector, and generating an indication of removal of an audio jack plug according to the detected transition In Example 15, the subject matter of Example 14 optionally includes inactivating the first connector and the second connector when detecting the transition.

In Example 16, the subject matter of one or any combination of Examples 14 and 15 optionally includes detecting a transition in the voltage detected at a second connector configured for electrical connection to microphone connector of the audio jack plug.

In Example 17, the subject matter of one or any combination of Examples 14-16 optionally includes detecting a sequential change in an electrical connection of the second connector from an electrical connection to a microphone connector to an open circuit connection to an electrical ground connector.

In Example 18, the subject matter of one or any combination of Examples 10-17 optionally includes detecting a voltage at the first connector that is lower than a circuit supply voltage and higher than electrical ground, and generating an indication of a function associated with the audio jack plug according to the detected voltage.

Example 19 includes subject matter (such as an apparatus), or can optionally be combined with the subject matter of one or any combination of Examples 1-18 to include such subject matter, comprising an audio jack receptacle, detection circuit, a logic circuit, and a processor. The audio jack receptacle is configured to receive an audio jack plug of a separate device, wherein the receptacle includes a first connector for electrical contact with a first conducting terminal of the audio jack plug and a second connector for electrical contact with a second conducting terminal of the audio jack plug, The detection circuit is configured to apply a first value of current to the first connector, apply a second value of current at the first connector when electrical ground is detected at the first connector, and apply the second value of current or a third value of at the second connector when electrical ground is detected at the first connector when the second value of current is applied to the first connector. The logic circuit is configured to generate an indication that the audio jack plug is fully inserted according to a logic level detected at the second connector when electrical ground is detected at the first connector. The processor is communicatively coupled to the detection circuit and logic circuit, wherein the processor configures an operation of the apparatus in response to the indication that the audio jack plug is fully inserted.

In Example 20, the subject matter of Example 19 optionally includes a logic circuit configured to generate an indication that a microphone connection is present in response to the detecting circuit detecting electrical ground at the first connector and detecting a high logic level at the second connector, and wherein the processor is configured to initiate an operation of the apparatus in response to the indication that a microphone connection is present.

In Example 21, the subject matter of one or any combination of Examples 19 and 20 optionally includes a CODEC circuit, wherein the processor is optionally configured to configure operation of the CODEC circuit in response to the indication that the audio jack plug is fully inserted.

In Example 22, the subject matter of one or any combination of Examples 19-21 optionally includes a detection circuit configured to detect a voltage level at the second connector that is less than a circuit supply rail voltage and electrical ground, and detect a transition in the voltage detected at the second connector. The logic circuit can optionally be configured to generate an indication of removal of an audio jack plug according to the transition detected by the detection circuit, and wherein the processor can optionally be configured to reconfigure the apparatus in response to the indication of removal of the audio jack plug.

In Example 23, the subject matter of one or any combination of Examples 19-22 optionally includes a microphone electrically connected to the audio plug jack, wherein a current value applied to the first connector or the second connector is less than a threshold value of current that activates the microphone.

Example 24 can include, or can optionally be combined with any portion or combination of any portions of any one or more of Examples 1-23 to include, subject matter that can include means for performing any one or more of the functions of Examples 1-23, or a machine-readable medium including instructions that, when performed by a machine, cause the machine to perform any one or more of the functions of Examples 1-23.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile computer-readable media during execution or at other times. These computer-readable media can include, but are not limited to, hard disks, removable magnetic disks, removable optical disks (e.g., compact disks and digital video disks), magnetic cassettes, memory cards or sticks, random access memories (RAM's), read only memories (ROM's), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An apparatus comprising:
   an audio jack receptacle including a first connector and a second connector configured for electrical communication with first conducting terminal and a last conducting terminal, respectively, of an audio jack plug, wherein the first conducting terminal is a conducting terminal inserted first into the audio jack receptacle and the last conducting terminal is a conducting terminal inserted last into the audio jack receptacle;
   a detection circuit configured to:
      apply a first value of current to the first connector; and
      apply a second value of current to the second connector; and
   a logic circuit configured to generate a signal that the audio jack plug is fully inserted when only electrical ground is detected at the first connector and a logic level is detected at the second connector; wherein the audio jack plug is fully inserted when the last conducting terminal of the audio jack plug is inserted into the audio jack receptacle.

2. The apparatus of claim 1, wherein the detection circuit is configured to increase the value of current applied to the first connector when detecting electrical ground at the first connector, and wherein the logic circuit is configured to generate the indication that the audio jack plug is fully inserted according to the logic level detected at the second connector when electrical ground is detected at the first connector when both the first value of current and the increased value of current are applied to the first connector.

3. The apparatus of claim 1, wherein the logic circuit is configured to generate an indication that a microphone connection is present in response to the detecting circuit detecting electrical ground at the first connector and detecting a high logic level at the second connector.

4. The apparatus of claim 3, including an audio coder-decoder (CODEC) circuit having a microphone input connection, wherein the microphone input connection is activated in response to receiving the generated indication.

5. The apparatus of claim 1, wherein the logic circuit is configured to generate an indication that the audio jack plug is connected to a three-pole headset in response to the detecting circuit detecting electrical ground at the first connector and detecting electrical ground at the second connector.

6. The apparatus of claim 1, wherein the detection circuit is configured to detect a voltage level at the second connector that is less than a circuit supply rail voltage and greater than electrical ground, and detect a transition in the voltage detected at the second connector, and wherein the logic circuit is configured to generate an indication of removal of an audio jack plug according to the transition detected by the detection circuit.

7. The apparatus of claim 6, wherein the logic circuit is configured to inactivate the first connector and the second connector when the transition in the voltage is detected.

8. The apparatus of claim 1, wherein the detection circuit is configured to generate an indication when detecting a sequential change in an electrical connection of the second connector from an electrical connection to a microphone connector to an open circuit connection to an electrical ground connection, and wherein the logic circuit is configured to inactivate the first connector and the second connector in response to the generated indication.

9. The apparatus of claim 1, wherein the detection circuit is configured to detect a voltage at the first connector that is lower than a circuit supply voltage and higher than electrical ground, and wherein the logic circuit is configured to generate an indication of a function associated with the audio jack plug according to the detected voltage.

10. A method comprising:
applying a first value of current at a first connector of an audio jack receptacle for an audio jack plug, wherein the first connector is configured for electrical contact with a first conducting terminal of the audio jack plug, wherein the first conducting terminal is a conducting terminal inserted first into the audio jack receptacle and the last conducting terminal is a conducting terminal inserted last into the audio jack receptacle;
applying a second value of current at a second connector of the audio jack receptacle for the audio jack plug when electrical ground is detected at the first connector when the first value of current is applied to the first connector, wherein the second connector is configured for electrical contact with a last conducting terminal of the audio jack plug; and
generating a signal that the audio jack plug is fully inserted into the audio jack receptacle when only ground is detected at the first connector and a logic level is detected at the second connector, wherein the audio jack plug is fully inserted when the last conducting terminal of the audio jack plug is inserted into the audio jack receptacle.

11. The method of claim 10, including increasing the value of current applied at the first connector when electrical ground is detected by applying the first value of current, wherein generating an indication includes generating an indication that the audio jack plug is fully inserted according to the logic level detected at the second connector when electrical ground is detected at the first connector when both the first value of current and the increased value of current are applied to the first connector.

12. The method of claim 10, including generating an indication that a microphone connection is present when detecting electrical ground at the first connector and detecting a high logic level at the second connector.

13. The method of claim 12, including activating a microphone connection at an audio coder-decoder (CODEC) circuit in response to the generated indication.

14. The method of claim 10, including:
detecting a voltage level at the second connector that is less than a circuit supply rail voltage and electrical ground;
detecting a transition in the voltage detected at the second connector; and
generating an indication of removal of an audio jack plug according to the detected transition.

15. The method of claim 14, including inactivating the first connector and the second connector when detecting the transition.

16. The method of claim 14, wherein detecting a transition in the voltage detected at the second connector includes detecting a transition in the voltage detected at a second connector configured for electrical connection to microphone connector of the audio jack plug.

17. The method of claim 14, wherein detecting a transition in the voltage detected at the second connector includes detecting a sequential change in an electrical connection of the second connector from an electrical connection to a microphone connector to an open circuit connection to an electrical ground connector.

18. The method of claim 10, including detecting a voltage at the first connector that is lower than a circuit supply voltage and higher than electrical ground; and generating an indication of a function associated with the audio jack plug according to the detected voltage.

19. An apparatus comprising:
an audio jack receptacle configured to receive an audio jack plug of a separate device, wherein the receptacle includes a first connector for electrical contact with a first conducting terminal of the audio jack plug and a second connector for electrical contact with a last conducting terminal of the audio jack plug, wherein the first conducting terminal is a conducting terminal inserted first into the audio jack receptacle and the last conducting terminal is a conducting terminal inserted last into the audio jack receptacle;
a detection circuit configured to:
apply a first value of current to the first connector;
apply a second value of current at the first connector when electrical ground is detected at the first connector; and
apply the second value of current or a third value of at the second connector when electrical ground is detected at the first connector when the second value of current is applied to the first connector;
a logic circuit configured to generate a signal that the audio jack plug is fully inserted when only electrical ground is detected at the first connector and a logic level is detected at the second connector, wherein the audio jack plug is fully inserted when the last conducting terminal of the audio jack plug is inserted into the audio jack receptacle; and
a processor communicatively coupled to the detection circuit and logic circuit, wherein the processor is configured to configure an operation of the apparatus in response to the indication that the audio jack plug is fully inserted.

20. The apparatus of claim 19, wherein the logic circuit is configured to generate an indication that a microphone connection is present in response to the detecting circuit detecting electrical ground at the first connector and detecting a high logic level at the second connector, and wherein the processor is configured to initiate an operation of the apparatus in response to the indication that a microphone connection is present.

21. The apparatus of claim 19, including an audio coder-decoder (CODEC) circuit, wherein the processor is configured to configure operation of the CODEC circuit in response to the indication that the audio jack plug is fully inserted.

22. The apparatus of claim 19, wherein the detection circuit is configured to detect a voltage level at the second connector that is less than a circuit supply rail voltage and electrical ground, and detect a transition in the voltage detected at the second connector, wherein the logic circuit is configured to generate an indication of removal of an audio jack plug according to the transition detected by the detection circuit, and wherein the processor is configured to reconfigure the apparatus in response to the indication of removal of the audio jack plug.

23. The apparatus of claim 19, including a microphone electrically connected to the audio plug jack, wherein a current value applied to the first connector or the second connector is less than a threshold value of current that activates the microphone.

* * * * *